United States Patent
Choi et al.

(10) Patent No.: US 7,388,645 B2
(45) Date of Patent: Jun. 17, 2008

(54) PRESSURE SEALING APPARATUS AND METHOD FOR FERRO-ELECTRIC LIQUID CRYSTAL DISPLAY

(75) Inventors: Suk Won Choi, Anyang-shi (KR); Su Seok Choi, Hanam-shi (KR)

(73) Assignee: LG Display Co., Ltd., Seoul (KR)

(*) Notice: Subject to any disclaimer, the term of this patent is extended or adjusted under 35 U.S.C. 154(b) by 402 days.

(21) Appl. No.: 11/073,707

(22) Filed: Mar. 8, 2005

(65) Prior Publication Data

US 2005/0146673 A1    Jul. 7, 2005

Related U.S. Application Data

(62) Division of application No. 10/021,018, filed on Dec. 19, 2001, now Pat. No. 6,876,430.

(30) Foreign Application Priority Data

Dec. 30, 2000 (KR) .................... 10-2000-87053

(51) Int. Cl.
*G02F 1/13* (2006.01)
*C09K 19/02* (2006.01)

(52) U.S. Cl. ............... 349/188; 349/172; 349/190

(58) Field of Classification Search ............... 349/188, 349/172, 187, 189, 190
See application file for complete search history.

(56) References Cited

U.S. PATENT DOCUMENTS

| | | | | |
|---|---|---|---|---|
| 5,019,201 A | * | 5/1991 | Yabu et al. | 156/273.9 |
| 5,061,045 A | * | 10/1991 | Yoneya et al. | 349/172 |
| 5,548,428 A | * | 8/1996 | Masaki et al. | 349/189 |
| 5,844,651 A | * | 12/1998 | Reimer et al. | 349/134 |
| 5,963,290 A | * | 10/1999 | Murai et al. | 349/191 |
| 6,335,717 B2 | * | 1/2002 | Hasegawa et al. | 345/97 |
| 6,657,686 B2 | * | 12/2003 | Choi | 349/92 |

FOREIGN PATENT DOCUMENTS

KR    1997-0048717    7/1997

* cited by examiner

*Primary Examiner*—James A Dudek
(74) *Attorney, Agent, or Firm*—McKenna Long & Aldridge LLP

(57) ABSTRACT

A pressure sealing apparatus and method for a ferroelectric liquid crystal display is disclosed for improving an alignment characteristic of a liquid crystal. In the apparatus and method, simultaneously with a pressurization of a liquid crystal display panel into which a liquid crystal has been injected, the liquid crystal display panel is subjected to a temperature treatment along with an application of an electric field.

5 Claims, 6 Drawing Sheets

US 7,388,645 B2

PRESSURE SEALING APPARATUS AND METHOD FOR FERRO-ELECTRIC LIQUID CRYSTAL DISPLAY

This application is a Divisional of prior application Ser. No. 10/021,018, filed Dec. 19, 2001 now U.S. Pat. No. 6,876,430.

This application claims the benefit of Korean Patent Application No. P2000-87053, filed on Dec. 30, 2000, the entirety of which is hereby incorporated by reference for all purposes as if fully set forth herein.

BACKGROUND OF THE INVENTION

1. Field of the Invention

This invention relates to a ferroelectric liquid crystal display, and more particularly to a pressure sealing apparatus and method for a ferroelectric liquid crystal display that is adaptive for improving an alignment characteristic of a liquid crystal.

2. Description of the Related Art

Generally, a liquid crystal display (LCD) controls light in accordance with a liquid crystal alignment state to thereby display a desired picture on the screen. A liquid crystal used for such an LCD is in a neutral phase between a liquid state and a solid state, which has both a fluidity and an elasticity. In a thermodynamic phase transition process of the liquid crystal, a liquid crystal having a smectic C phase is rotated along a smectic layer taking a layer structure having the same electrical and magnetic property. In other words, the smectic C phase liquid crystal is rotated along an outer line of a virtual cone.

Such a smectic C phase liquid crystal has a characteristic of making a spontaneous polarization regardless of an external electric field. This liquid crystal is usually referred to as 'ferroelectric liquid crystal' (FLC). The FLC has been actively studied in light of a fast response speed according to its spontaneous polarization characteristic and an ability to realize a wide viewing angle without a special electrode structure and a compensating film. The FLC includes a deformed helix FLC mode, a surface stabilized FLC mode, an anti-FLC mode, a V-type FLC mode and a half V-type FLC mode, etc. Hereinafter, the V-type FLC mode and the half V-type FLC mode in such modes will be described.

FIG. 1 shows an alignment state of a liquid crystal cell in the V-type FLC mode.

Referring to FIG. 1, the liquid crystal cell in the V-type FLC mode includes an upper substrate 1 on which a common electrode 3 and an alignment film 5 are disposed, a lower substrate 11 on which a TFT array 9 including a pixel electrode and an alignment film 7, and a liquid crystal 13 injected between the upper and lower substrates 1 and 11. The alignment films 5 and 7 formed on the upper substrate 1 and the lower substrate 11, respectively, are aligned in the horizontal direction by the rubbing. Subsequently, the liquid crystal 13 is injected between the upper substrate 1 and the lower substrate 11 after joining of the upper substrate 1 to the lower substrate 11. The injected liquid crystal 13 forms a smectic layer taking a layer structure and is arranged into a phase having a desired slope with respect to a plane perpendicular to the smectic layer. In other words, the liquid crystal 13 has a desired inclination angle with respect to a horizontally aligned direction of the alignment film and is aligned such that the adjacent smectic layers have opposite polarities with respect to each other.

A transmittance according to a voltage of the V-type FLC mode liquid crystal cell is indicated in FIG. 2. The liquid crystal 13 within the V-type FLC mode liquid crystal cell responds to positive and negative voltages applied thereto. Since the transmittance is suddenly changed according to an application of the positive and negative voltages, a transmittance curve according to a voltage has roughly a V-shape. In other words, a transmittance is increased, independently of the polarities, as a positive voltage increases.

FIG. 3 shows an alignment state of a liquid crystal cell in the half V-type FLC mode.

In FIG. 3, a liquid crystal 15 within the half V-type FLC mode liquid crystal cell injected between the upper substrate 1 and the lower substrate 11 forms a smectic layer taking a layer structure. The liquid crystal 15 is aligned at a desired inclination angle with respect to a horizontal aligned direction of the alignment films 5 and 7 such that the adjacent smectic layers have a different polarity unlike the liquid crystal 13 in the V-type FLC mode. Such a half V-type mode liquid crystal can be implemented by applying a positive or negative electric field in advance and, at the same time, lowering its temperature into a temperature having a smectic phase. The half V-type FLC mode liquid crystal 15 formed in this manner responds to only one of the applied positive and negative voltages. Thus, as seen from FIG. 4, a transmittance curve according to a voltage of a liquid crystal cell in the half V-type FLC mode has a 'half V' shape. A T-V characteristic in FIG. 4 represents when a negative voltage is used to make an initial uniform alignment. In this case, a transmittance appears to not increase upon application of a negative voltage, whereas it is increased as a positive voltage increases. Similarly, when a positive voltage is used to make an initial uniform alignment, a transmittance is increased as a negative voltage increases.

A thermodynamic phase transition process of the half V-type FLC mode liquid crystal 15 is as follows:

Isotropic→nematic (N*) phase→smectic C* (Sm C*) phase→crystal

Such a phase transition process expresses a liquid crystal phase resulting from a gradual decrease in temperature as moving to the right. The liquid crystal 15 is aligned in parallel to a rubbing direction when its temperature is slowly lowered to reach a temperature having a nematic phase after the liquid crystal 15 was injected into the liquid crystal cell at a temperature having an isotropic phase. If an electric field is applied to the interior of the cell with a temperature being slowly lowered in this state, then the liquid crystal 15 is phase-changed into a smectic phase. A direction of a spontaneous polarization of the liquid crystal 15 generated at this time is arranged in such a manner to be consistent with that of an electric field formed at the interior of the cell. As a result, when the liquid crystal 15 within the liquid crystal cell is subjected to a parallel alignment treatment, it makes one of two possible molecule arrangements. The molecule arrangement in the spontaneous polarization direction is consistent with the direction of an electric field applied in the phase transition process, and thereby has a uniform alignment state.

This will be described in detail with reference to FIG. 5 and FIG. 6 below.

First, as seen from FIG. 5, if a negative electric field E(−) is applied upon alignment of the liquid crystal 15, then a spontaneous polarization direction of the liquid crystal 15 identical to the electric field direction is made to provide a uniform alignment. In such a liquid crystal cell, as shown in FIG. 6, a liquid crystal arrangement is changed upon application of a positive electric field E(+) while it is not changed upon application of a negative electric field E(−). In order to utilize a response characteristic to an electric field of the liquid crystal 15, polarizers perpendicular to each other are arranged at the upper and lower portions of the liquid crystal cell. At this time, a transmission axis of one polarizer is arranged to be consistent with an initial liquid crystal alignment direction. In the liquid crystal cell taking the above-mentioned arrangement, a transmission curve according to a voltage application has a 'half V' shape as shown in FIG. 4. With respect to a negative electric field E(−), a liquid crystal arrangement is not changed to shut off light. Otherwise, with respect to a positive electric field E(+), a liquid crystal arrangement is changed to transmit light. In this case, as a positive electric field E(+) increases, a transmittance increases.

As described above, the half V-type FLC mode liquid crystal utilizes both a temperature and an electric field so as to obtain a uniform alignment.

A method of fabricating LCD's including the ferroelectric LCD is classified into substrate cleaning, substrate patterning, alignment film formation, substrate joining/liquid crystal injection, packaging and test processes.

In the substrate cleaning process, a cleaner removes an alien substance on the substrates before and after patterning of the upper and lower substrates.

The substrate patterning process is divided into a step of patterning the upper substrate and a step of patterning the lower substrate. The upper substrate is provided with color filters, a common electrode and black matrices, etc. The lower substrate is provided with signal wires such as data lines and gate lines, etc. A thin film transistor (TFT) is arranged at each intersection between the data lines and the gate lines. A pixel electrode is formed at each pixel area between the data lines and the gate lines.

In the alignment film formation process, an alignment film is coated on each of the upper substrate and the lower substrate and then rubbed.

In the substrate joining/liquid crystal injection process, the upper substrate is joined to the lower substrate after a sealant is coated onto the lower substrate. Subsequently, a liquid crystal is injected between the upper and lower substrates through a liquid crystal injection hole provided at one side of the sealant. Thereafter, the liquid crystal injection hole is sealed.

A cell gap of the liquid crystal display panel may become non-uniform due to the liquid crystal injected between the upper and lower substrates. A non-uniformity of the cell gap increases as a viscosity of the liquid crystal increases, as a liquid crystal injection time increases, or as a gap of the liquid crystal display panel decreases. In order to prevent such a non-uniformity of the cell gap that may occur in the substrate joining/liquid crystal injection process, a pressure-sealing process of pressurizing the liquid crystal display panel injected with the liquid crystal at an entirely uniform pressure and then sealing the liquid crystal injection hole using an apparatus as shown in FIG. 7 is employed.

FIG. 7 shows a conventional pressure sealing apparatus.

Referring to FIG. 7, the conventional pressure sealing apparatus includes an upper pressurizing plate 101 for pressurizing the liquid crystal display panel downwardly, and a lower plate 102 for supporting the pressurized liquid crystal display panel from the lower portion thereof.

The liquid crystal display panel includes an upper substrate 103 on which a common electrode 111 and an upper alignment film 104 are disposed; a lower substrate 107 on which a pixel electrode 110 and a lower alignment film 106 are disposed; and a liquid crystal 105 injected between the upper substrate 103 and the lower substrate 107. Further, sealants 108 and 109 and spacers (not shown) for defining a gap so that the liquid crystal 105 can be injected are provided between the lower substrate 107 and the upper substrate 103 of the liquid crystal display panel.

After the liquid crystal injection, the liquid crystal display panel is put on the lower plate 102 of the pressure sealing apparatus. The liquid crystal display panel on the upper plate 102 is pressurized at a constant pressure by the upper pressurizing plate 101. Then, a uniform pressure is applied to the entire liquid crystal display panel by a pressure from the upper pressurizing plate 101, thereby allowing a cell gap of the liquid crystal display panel to be uniform. When the cell gap of the liquid crystal display panel becomes entirely uniform, the liquid crystal injection hole is sealed with the sealant 108, which is a photo hardening resin.

However, the conventional pressure sealing process is suitable for a nematic phase liquid crystal which has a low viscosity and remains in a liquid state, but has a problem in that it is difficult to be applied to a ferroelectric liquid crystal having a smectic phase that keeps a high viscosity gel state at a normal temperature. If a pressure is applied to a high viscosity liquid crystal, then an interface of the alignment film aligned at a certain inclination angle by the rubbing process is destroyed or deformed, thereby causing a deformation in an alignment property of the liquid crystal.

Meanwhile, the ferroelectric liquid crystal has a problem of thermal contraction according a thermal expansion coefficient when the liquid crystal is phase-changed from a nematic phase into a smectic phase. Accordingly, in the case of pressurizing a ferroelectric liquid crystal, it is necessary to pressurize the ferroelectric liquid crystal while slowly lowering a temperature of the liquid crystal from a temperature at which the liquid crystal has the largest bulk.

Furthermore, a half V-type FLC mode liquid crystal is subjected to a temperature treatment and an application of an electric field so as to obtain a uniform alignment. The half V-type FLC mode liquid crystal has a problem in that, since it becomes more difficult to uniformly apply a large-area liquid crystal layer to the electric field and the temperature treatment because the LCD has a larger area, it is difficult to pressure seal a ferroelectric liquid crystal layer having a uniform alignment characteristic at a large area.

SUMMARY OF THE INVENTION

Accordingly, the present invention is directed to a pressure sealing apparatus and method for ferro electric liquid crystal display that substantially obviates one or more of the problems due to limitations and disadvantages of the related art.

Accordingly, it is an advantage of the present invention to provide a pressure sealing apparatus and method for a ferroelectric liquid crystal display that is adaptive for improving an alignment characteristic of a liquid crystal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other advantages of the invention, a pressure sealing apparatus for a ferroelectric liquid crystal display according to one aspect of the present invention includes means for pressurizing a liquid crystal display panel; and a heat coil provided at the pressurized surface of the liquid crystal display panel pressurizing means to heat the liquid crystal display.

The pressure sealing apparatus further includes a plurality of voltage-applying bars provided at one end of the liquid crystal display panel pressurizing means in contact with electrode pads of the liquid crystal display panel upon pressurizing of the liquid crystal display panel.

The pressure sealing apparatus further includes a temperature controller for controlling a temperature of the heat coil.

The pressure sealing apparatus further includes an elastic member provided between the voltage-applying bars and the liquid crystal display panel pressurizing means to elastically pressurize the voltage-applying bars into the electrode pads.

The pressure sealing apparatus further includes a voltage controller for controlling voltages applied to the voltage-applying bars.

The pressure sealing apparatus further includes a lower plate for supporting the liquid crystal display panel from the lower portion thereof; and a second heat coil provided at the lower plate to heat the liquid crystal display panel by the control of the temperature controller.

A method of pressure-sealing a ferroelectric liquid crystal display according to another aspect of the present invention includes the steps of injecting a ferroelectric liquid crystal into a liquid crystal display panel; pressurizing the liquid crystal display panel into which the ferroelectric liquid crystal has been injected; applying an electric field to the liquid crystal display panel simultaneously with the pressurization of the liquid crystal display panel; and making a temperature treatment of the liquid crystal display panel simultaneously with the pressurization of the liquid crystal display panel.

In the method, the temperature treatment step includes cooling the ferroelectric liquid crystal from a temperature corresponding to a nematic phase of the ferroelectric liquid crystal into a temperature phase-changed into a smectic phase.

The pressure sealing method further includes the steps of sealing a liquid crystal injection hole into which the liquid crystal is injected, after a cell gap of the liquid crystal display panel is kept constant.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
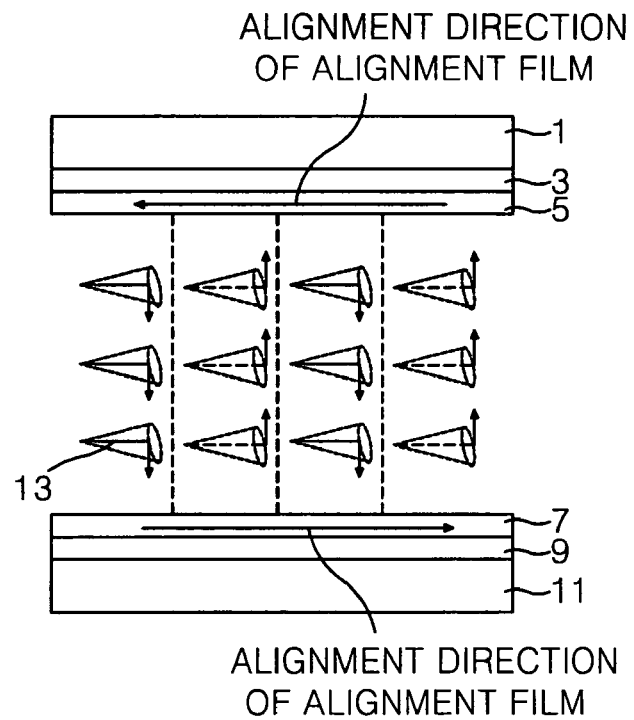
FIG. 1 illustrates an alignment state of a liquid crystal in a conventional V-type FLC mode.
Figure 2:
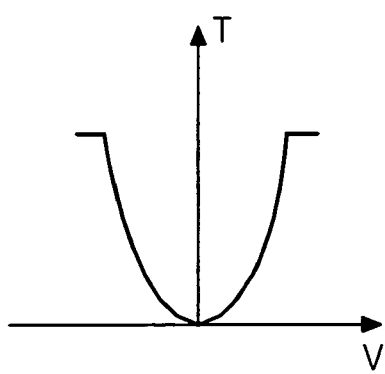
FIG. 2 is a graph representing a transmittance according to a voltage of the V-type FLC mode liquid crystal.
Figure 3:
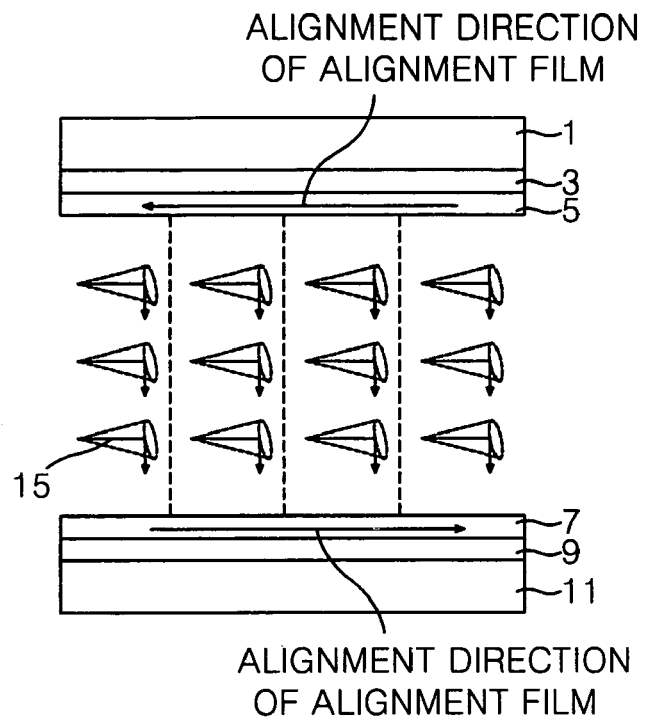
FIG. 3 illustrates an alignment state of a liquid crystal in a conventional half V-type FLC mode.
Figure 4:
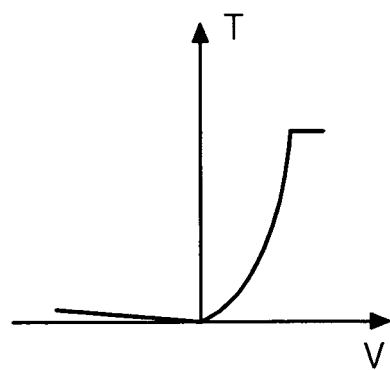
FIG. 4 is a graph representing a transmittance according to a voltage of the half V-type FLC mode liquid crystal cell.
Figure 5:
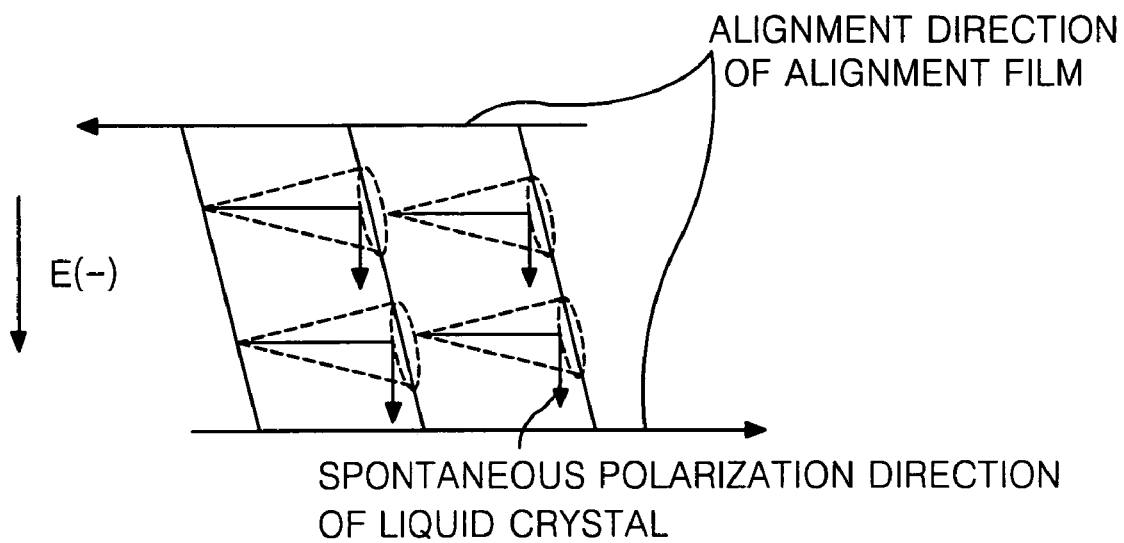
FIG. 5 illustrates a method of applying an electric field to implement the half V-type FLC mode liquid crystal.
Figure 6:
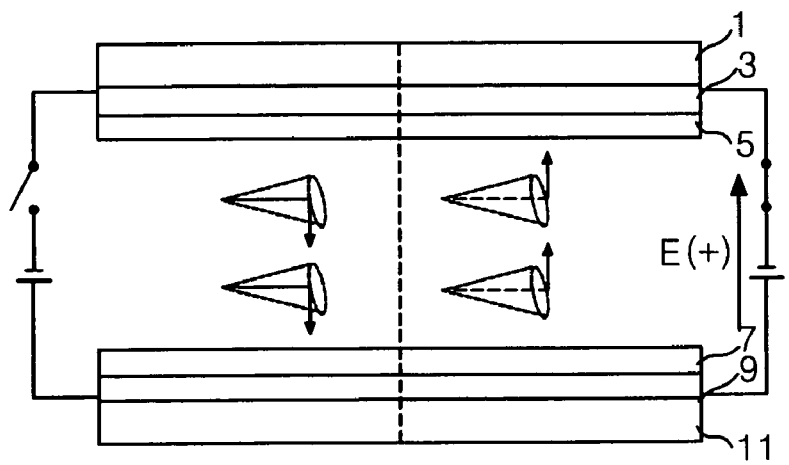
FIG. 6 depicts a motion of a liquid crystal upon application of a voltage to the half V-type FLC mode liquid crystal.
Figure 7:
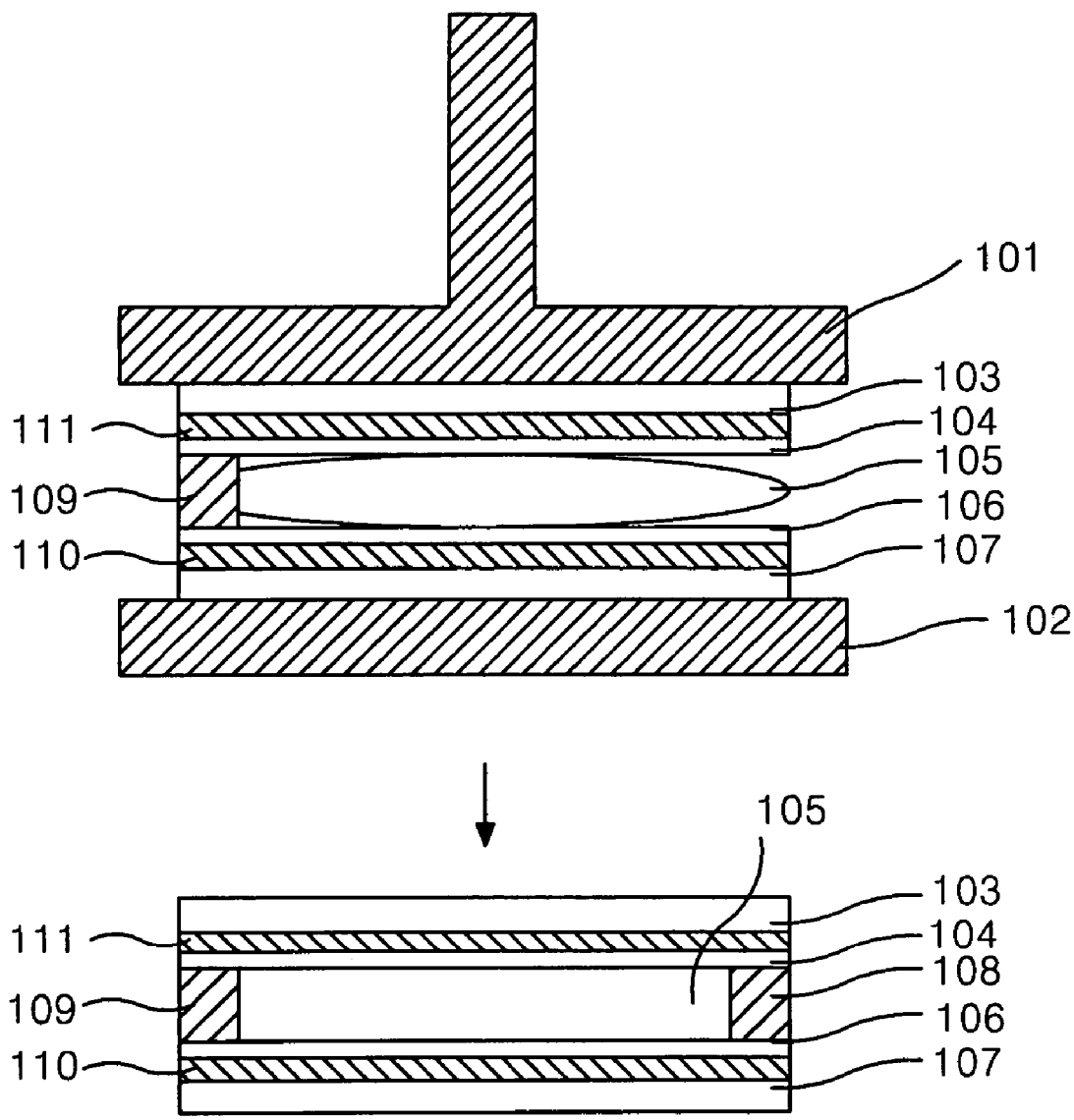
FIG. 7 is a section view showing a structure of a conventional pressure sealing apparatus.
Figure 8:
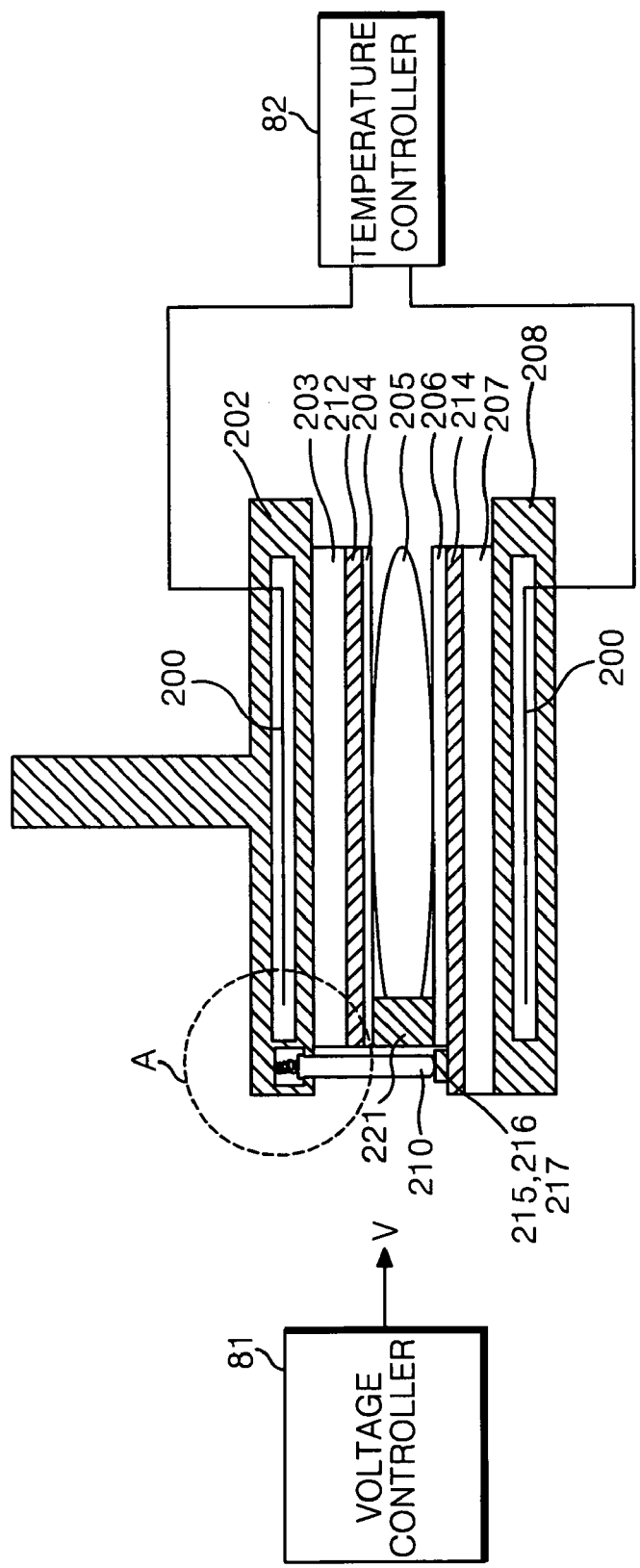
FIG. 8 is a section view showing a structure of a pressure sealing apparatus for a ferroelectric liquid crystal display device according to an embodiment of the present invention.
Figure 9:
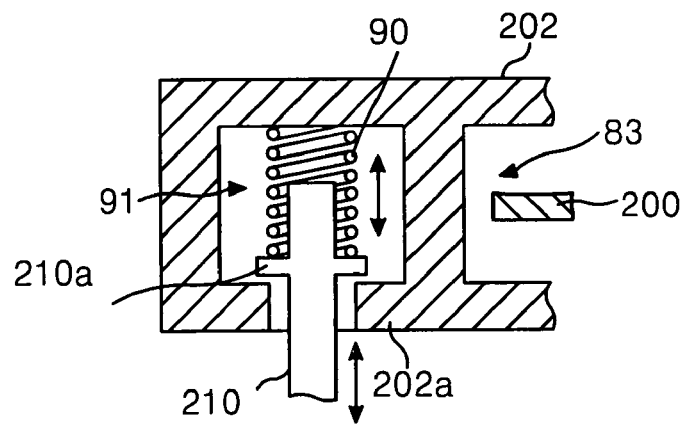
FIG. 9 is an enlarged view of portion A indicated by a dotted circular line in FIG. 8.

Referring to FIG. 8 and FIG. 9, there is shown a pressure sealing apparatus according to an embodiment of the present invention.

The pressure sealing apparatus includes an upper pressurizing plate 202 for pressurizing a liquid crystal display panel downwardly, a plurality of voltage-applying bars 210 provided at the edge of the upper pressurized plate 202 to apply a voltage, a lower plate 208 for supporting the pressurized liquid crystal display panel from the lower part thereof, and a heat coil 200 installed at the interior of the upper pressurizing plate 202 and the lower plate 208 to generate heat.

Figure 10:
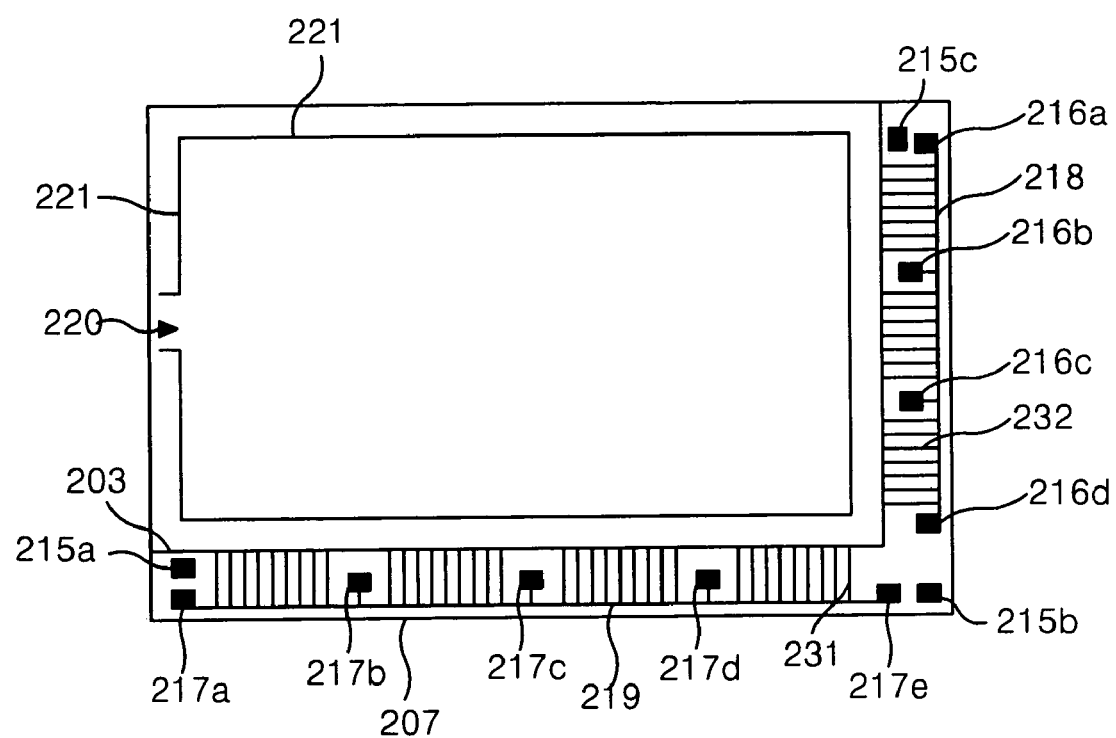
FIG. 10 is a plan view showing a structure of a liquid crystal display panel according to an embodiment of the present invention.

An upper substrate 203 of the liquid crystal display panel is provided with a common electrode 212 and an upper alignment film 204. A lower substrate 207 of the liquid crystal display panel is provided with a pixel electrode 214 and a lower alignment film 206. The upper substrate 203 is joined to the lower substrate 207 with a sealant 221 and a spacer (not shown) therebetween. The sealant 221 and the spacer define a gap into which a liquid crystal is injected. As shown in FIG. 10, a ferroelectric liquid crystal 205 is injected into the liquid crystal display panel through a liquid crystal injection hole 220 provided at one side of the sealant 221.

The voltage-applying bars 210 provided at the edge of the upper pressurizing plate 202 apply a voltage, via electrode pads 215, 216 and 217, to a gate/data signal wire provided at the lower substrate 207 and the common electrode 212 provided at the upper substrate 203 in the pressure sealing process. As shown in FIG. 9, the edge of the upper pressurizing plate 202 provided with each voltage-applying bar 210 is provided with a bar inserting hole 91 into which the upper ends of the voltage-applying bars 210 are inserted. The lower portion of the bar inserting hole 91 is provided with a stopper 202a protruded into the inner side of the bar inserting hole 91. A rib 210a is provided at one side of the upper end of the voltage-applying bar 210. The upper end of the voltage-applying bar 210 positioned over the rib 210a is wound with a spring 90. The spring 90 plays the role of vertically depressing the voltage-applying bar 210 by a desired elastic force so that the lower end of the voltage-applying bar 210 can be connected to the electrode pads 215, 216 and 217 provided at the lower substrate 207 of the liquid crystal display panel. Even though a pressure applied to the liquid crystal display panel by means of the spring 90 is large, the gap for injecting a liquid crystal is kept constant without any damage of the electrode pads 215, 216 and 217.

In FIG. 9, a heat coil-receiving hole 83 is defined at the interior of each of the upper pressurizing plate 202 and the lower plate 208 (not shown). The heat coil 200 is uniformly wound within the heat coil-receiving hole 83 at the entire pressurized surface of the upper pressurizing plate 202 and the entire surface loaded with the liquid crystal display panel of the lower plate 208. The heat coil 200 plays the role of generating heat depending on an input current to apply the heat to the liquid crystal display panel in the pressure sealing process.

The present pressure sealing apparatus further includes a temperature controller 82 for applying a current to the heat coil 200, and a voltage controller 81 for applying a voltage to the voltage-applying bars 210 as shown in FIG. 8.

The temperature controller 82 controls a current amount applied to the heat coil 200 in accordance with a phase change temperature of the ferroelectric liquid crystal. By such a temperature control, a temperature of the ferroelectric liquid crystal injected into the liquid crystal display panel in the pressure sealing process is gradually lowered to be phase-changed from a nematic phase into a smectic phase.

The voltage controller 81 controls a voltage applied to each voltage-applying bar 210. By this voltage control, an electric field is applied to the ferroelectric liquid crystal injected into the liquid crystal display panel in the pressure sealing process.

Referring again to FIG. 10, a liquid crystal display panel according to an embodiment of the present invention includes data shorting bars 219 connected to a plurality of data signal wires 231 at the lower edge of the lower substrate 207, gate shorting bars 218 connected to a plurality of gate signal wires 232 at the right edge of the lower substrate 207, a plurality of Vcom pads 215a to 215c provided at the lower edge and the right edge of the lower substrate 207 to be connected to the common electrode 212 of the upper substrate 203 through Ag dots (not shown), a plurality of gate voltage-applying pads 216a to 216d connected to the gate shorting bars 218 at the right edge of the lower substrate 207, and a plurality of data voltage-applying pads 217a to 217e connected to the data shorting bars 219 at the lower edge of the lower substrate 207.

The Vcom pads 215a to 215c, the gate voltage-applying pads 216a to 216d and the data voltage-applying pads 217a to 217e subdivide the electrode pads 215, 216 and 217 shown in FIG. 8, respectively.

The gate shorting bars 218 commonly connect the plurality of gate signal wires 232 to a ground voltage source GND (not shown), thereby allowing a static electricity created in the course of the process to be discharged into the ground voltage for the purpose of eliminating the ground voltage source GND. The data shorting bars 219 commonly connect the plurality of data signal wires 231 to a ground voltage source GND (not shown), thereby allowing a static electricity created in the course of the process to be discharged into the ground voltage for the purpose of eliminating the ground voltage source GND. Further, the gate shorting bars 218 and the data shorting bars 219 apply voltages inputted, via the gate voltage-applying pads 216a to 216d and the data voltage-applying pads 217a to 217e, from the voltage-applying bars 210 in the pressure sealing process to the gate signal wires 232 and the data signal wires 231, respectively.

The Vcom pads 215a to 215c are connected to the common electrode 212 of the upper substrate 203 through Ag dots (not shown) and are connected to the voltage-applying bars 210 in the pressure sealing process, thereby applying a common voltage inputted from the voltage-applying bars 210 to the common electrode 212.

Hereinafter, a pressure sealing process according to an embodiment of the present invention will be described step by step.

First, the upper pressurizing plate 202 begins pressurizing the liquid crystal display panel while being descended at a constant pressure. At the same time, the temperature controller 82 applies a current corresponding to a nematic phase temperature of the ferroelectric liquid crystal 205 to the heat coil 200. Then, the ferroelectric liquid crystal 205 keeps a nematic phase. Subsequently, when the upper pressurizing plate 202 is constantly pressurizing the liquid crystal display panel, the temperature controller 82 gradually reduces a current amount applied to the heat coil 200 so that a temperature of the heat coil 200 can be gradually lowered. At this time, a uniform heat is applied to the entire liquid crystal display panel because the heat coil 200 is widely distributed over the entire surface of the upper pressurizing plate 202 and the lower plate 208. By such a temperature control, temperatures of the upper pressurizing plate 202 and the lower plate 208 are gradually lowered. As a result, the ferroelectric liquid crystal 205 is phase-changed from a nematic phase into a smectic phase.

Simultaneously with this temperature treatment, upon descending motion of the upper pressurizing plate 202, a common voltage, a gate voltage and a data voltage are applied to the plurality of voltage-applying bars 210 connected to the Vcom pads 215a to 215c, the gate voltage-applying pads 216a to 216d and the data voltage-applying pads 217a to 217e, respectively. The common voltage is applied, via the Vcom pads 215a to 215c, to the common electrode 212 of the upper substrate 203. The gate voltage is applied, via the gate signal wires 232, to the gate electrode of the TFT to define a channel between the data signal wire 231 and the pixel 214, thereby applying the data voltage to the pixel electrode 214.

Accordingly, the ferroelectric liquid crystal 205 phase-changed into a smectic phase undergoes the temperature treatment along with the pressurization and, at the same time, is arranged by an electric field applied between the common electrode 212 and the pixel electrode 214 such that its spontaneous polarization direction is consistent with a direction of the electric field. The electric field is uniformly applied to the entire liquid crystal display panel because the voltage-applying bars 210 apply the same voltage to the liquid crystal display at various positions of the liquid crystal display panel.

Also, a cell gap of the liquid crystal display panel becomes uniform over its entire surface by virtue of a pressure applied by the upper pressurizing plate 202. When the cell gap becomes uniform, a light-hardening resin seals the liquid crystal injection hole 220.

As described above, according to the present invention, a viscosity caused by a heating of the liquid crystal cell is reduced to prevent a damage of the alignment film in the pressure sealing process. Also, a speed of the cooling temperature is adjusted to appropriately control a phase transition process from a nematic phase into a smectic process, thereby improving the alignment characteristic. Furthermore, an electric field can be directly applied to the liquid crystal display panel during the pressure sealing process, so that it becomes possible to stabilize an alignment of the liquid crystal cell in the pressure sealing process. In addition, the heat coil and the voltage-applying bars are provided to pressurize the liquid crystal display panel and to apply heat and an electric field. Accordingly, the ferroelectric liquid crystal display can be fabricated in the pressure sealing process.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of pressure-sealing a ferroelectric liquid crystal display, comprising:
   injecting a ferroelectric liquid crystal into a liquid crystal display panel;
   pressurizing the liquid crystal display panel into which the ferroelectric liquid crystal has been injected;
   applying an electric field to the liquid crystal display panel simultaneously with the pressurization of the liquid crystal display panel; and
   performing a temperature treatment of the liquid crystal display panel simultaneously with the pressurization of the liquid crystal display panel,
   wherein pressurizing, applying an electric field and performing a temperature treatment are performed using a pressure sealing apparatus, the pressure sealing apparatus comprises;
   an upper pressurizing plate,
   a plurality of voltage-applying bars formed at an edge of the upper pressurizing plate,
   a lower plate, and
   a heat coil formed at the interior of the upper pressurizing plate and the lower plate,
   wherein the liquid crystal display panel is disposed between the upper pressurizing plate and the lower plate.

2. The method according to claim 1, wherein the temperature treatment includes:
   cooling the ferroelectric liquid crystal from a temperature corresponding to a nematic phase of the ferroelectric liquid crystal to a temperature of a phase-change to a smectic phase.

3. The method according to claim 1, further comprising the steps of:
   sealing a liquid crystal injection hole into which the liquid crystal is injected, after a cell gap of the liquid crystal display panel is uniform.

4. The method according to claim 1, the pressure sealing apparatus comprises electrode pads formed on the voltage-applying bars.

5. The method according to claim 1, the pressure sealing apparatus comprises a rib formed on the upper end of the voltage-applying bars.

* * * * *